United States Patent
Yamamoto et al.

(10) Patent No.: US 11,444,353 B2
(45) Date of Patent: Sep. 13, 2022

(54) BATTERY PACK

(71) Applicants: DENSO CORPORATION, Kariya (JP); YAZAKI CORPORATION, Tokyo (JP)

(72) Inventors: Hiroyoshi Yamamoto, Kariya (JP); Shota Iguchi, Kariya (JP); Koji Yamashita, Kariya (JP); Hisato Inoue, Kariya (JP); Yoshiaki Ichikawa, Kakegawa (JP); Katsunori Sato, Kakegawa (JP); Hidehiro Takasugi, Kakegawa (JP)

(73) Assignees: DENSO CORPORATION, Kariya (JP); YAZAKI CORPORATION, Tokyo (JP)

( * ) Notice: Subject to any disclaimer, the term of this patent is extended or adjusted under 35 U.S.C. 154(b) by 71 days.

(21) Appl. No.: 15/655,052

(22) Filed: Jul. 20, 2017

(65) Prior Publication Data
US 2018/0034021 A1    Feb. 1, 2018

(30) Foreign Application Priority Data
Jul. 29, 2016 (JP) .............................. JP2016-149563

(51) Int. Cl.
*H01M 50/20* (2021.01)
*H01M 50/24* (2021.01)
(Continued)

(52) U.S. Cl.
CPC ......... *H01M 50/20* (2021.01); *H01M 10/625* (2015.04); *H01M 10/627* (2015.04);
(Continued)

(58) Field of Classification Search
CPC . H01M 10/60–647; H01M 50/20–375; H01M 50/50–512; H01M 50/528–529; H01M 10/65–667
See application file for complete search history.

(56) References Cited

U.S. PATENT DOCUMENTS

| 2006/0216582 A1* | 9/2006 | Lee ..................... | H01M 2/1077 |
| | | | 429/120 |
| 2008/0247135 A1* | 10/2008 | Inoue .................. | H01M 2/1077 |
| | | | 361/695 |

(Continued)

FOREIGN PATENT DOCUMENTS

| JP | 2005-071674 A | 3/2005 | |
| JP | 2008234936 A * | 10/2008 | ............ H01M 10/50 |

(Continued)

OTHER PUBLICATIONS

Machine Translation of Fukada, JP 2008-234936. Originally Published Oct. 2, 2008. (Year: 2008).*

*Primary Examiner* — Jonathan Crepeau
*Assistant Examiner* — Jacob Buchanan
(74) *Attorney, Agent, or Firm* — Oliff PLC (57) ABSTRACT

A battery pack has bus bars, a battery stack which is an assembly of plural battery cells, a bus bar casing which supports a bus bar casing, and a cover member. Electrode terminals of battery cells adjacently arranged in the battery stack are connected together through the bus bars. An upstream side passage and a downstream side passage are formed between the bus bars and the cover member. Upstream side wall surfaces forming an inlet part of the upstream side passage or downstream side wall surfaces forming an outlet part of the downstream side passage is arranged at a location closer to the battery cell side than a location of a surface of the bus bar side.

8 Claims, 6 Drawing Sheets

(51) Int. Cl.
*H01M 50/502* (2021.01)
*H01M 10/6566* (2014.01)
*H01M 10/627* (2014.01)
*H01M 10/625* (2014.01)
*H01M 10/6561* (2014.01)

(52) U.S. Cl.
CPC ... *H01M 10/6561* (2015.04); *H01M 10/6566* (2015.04); *H01M 50/24* (2021.01); *H01M 50/502* (2021.01); *H01M 2220/20* (2013.01)

(56) References Cited

U.S. PATENT DOCUMENTS

| | | | | |
|---|---|---|---|---|
| 2009/0061305 | A1* | 3/2009 | Nishida | H01M 2/1072 |
| | | | | 429/164 |
| 2009/0078400 | A1* | 3/2009 | Tamura | H01M 10/625 |
| | | | | 165/287 |
| 2009/0226800 | A1 | 9/2009 | Ueshima et al. | |
| 2010/0255360 | A1 | 10/2010 | Umemoto et al. | |
| 2011/0020686 | A1* | 1/2011 | Yamamoto | H01M 2/20 |
| | | | | 429/120 |
| 2011/0104532 | A1* | 5/2011 | Buck | F16K 17/16 |
| | | | | 429/82 |
| 2011/0151311 | A1* | 6/2011 | Lee | H01M 2/1077 |
| | | | | 429/156 |
| 2011/0300421 | A1* | 12/2011 | Iritani | H01M 10/6557 |
| | | | | 429/72 |
| 2012/0082875 | A1* | 4/2012 | Watanabe | H01M 2/1077 |
| | | | | 429/71 |
| 2012/0129030 | A1* | 5/2012 | Lim | H01M 10/6556 |
| | | | | 429/120 |

FOREIGN PATENT DOCUMENTS

| | | |
|---|---|---|
| JP | 2010-113888 A | 5/2010 |
| JP | 2010-198930 A | 9/2010 |
| JP | 2013-105674 A | 5/2013 |
| JP | 2014-093208 A | 5/2014 |

* cited by examiner

BATTERY PACK

CROSS-REFERENCE TO RELATED APPLICATION

This application is related to and claims priority from Japanese Patent Application No. 2016-149563 filed on Jul. 29, 2016, the contents of which are hereby incorporated by reference.

BACKGROUND OF THE INVENTION

1. Field of the Invention

The present invention relates to battery packs having a battery stack composed of plural battery cells which are electrically connected together by conductive members such as bus bars.

2. Description of the Related Art

A battery pack, disclosed by patent document 1, Japanese patent No. 4632097, has a structure in which battery cells are connected together by using bus bars, and cooling fluid, for example cooling air is supplied to cooling fins, the cooling fins are connected to the bus bars so as to promote heat radiation from the battery cells and to reduce a temperature of the battery cells.

In the structure of the battery pack disclosed in patent document 1 previously described, the bus bars are covered with a casing member. When a cooling fluid passage is formed between the bus bars and the casing member, narrow gaps are formed between the cooling fins and the casing member. Due to the small flow resistance, the narrow gaps allow cooling air to easily flow. This may cause a difficulty in generating air flow closer to the bus bars, which generate a large amount of heat energy. Accordingly, there is a need for the battery pack to have improved cooling performance of the bus bars.

SUMMARY

It is therefore desired to provide a battery pack having a battery stack composed of plural battery cells which has increased cooling capability capable of cooling conductive members, to which electrode terminals of the battery cells are electrically connected, with high efficiency.

An exemplary embodiment provides a battery pack having improved cooling capability for cooling conductive members through which electrode terminals of battery cells are electrically connected together. The battery pack is basically composed of those conductive members, a battery stack, a supporting member and a cover member. The battery cells form a battery stack, and the battery cells are stacked in the battery stack in a cell stacking direction. That is, the battery stack is an assembly of those battery cells connected together by the conductive members. The electrode terminals of the battery cells, which are adjacently arranged from each other in the cell stacking direction, are electrically connected by using the conductive members. The supporting member is made of electrically insulating material and supports the conductive members. The cover member and the conductive members form a cooling fluid passage. That is, the cooling fluid passage is formed between the cover member and the conductive members. The cooling fluid passage allows cooling fluid to flow so as to cool the conductive members and the battery cells. In the structure of the battery pack previously described, at least a part of upstream side wall surfaces, which form an inlet part of the cooling fluid passage, and/or at least a part of downstream side wall surfaces, which form an outlet part of the cooling fluid passage, are arranged at a location closer to the battery cell side than a surface of the conductive members.

In the improved structure of the battery pack according to the present invention previously described, at least a part of the upstream side wall surfaces, which form the inlet part of the cooling fluid passage, are arranged closer to the location of the battery cells than the location of the surface of the conductive members (for example, bus bars). The inlet part of the cooling fluid passage is located at the upstream side of the cooling fluid when compared with the location of the conductive members. This improved structure of the battery pack makes it possible to allow the cooling fluid to flow into the inside of the cooling fluid passage through the location which is closer to the battery cells side, at the upstream side of the cooling fluid, than the location of the conductive members. That is, the battery cells are located lower in position than the location of the conductive members in a cell height direction of the battery pack. This structure makes it possible to supply the cooling fluid to the inside of the cooling fluid passage through the location close to the surface of the conductive members, and to allow the cooling fluid to flow along the surface of the conductive members with high efficiency. This makes it possible to provide the battery pack having improved structure and enhanced heat exchange performance between the conductive members and the cooling fluid.

Further, according to the battery pack having the improved structure previously described, at least a part of the downstream side wall surfaces, which form the outlet part of the cooling fluid passage, are arranged closer to the location of the battery cells than the location of the surface of the conductive members. The outlet part of the cooling fluid passage is located at the downstream side of the cooling fluid when compared with the location of the conductive members. This improved structure of the battery pack makes it possible to allow the cooling fluid to be externally discharged from the cooling fluid passage through the location close to the battery cells side. This improved structure of the battery pack makes it possible to supply the cooling fluid to the surface of the conductive members with high efficiency while the cooling fluid flows toward the outlet part of the cooling fluid passage, and further to promote the flow of the cooling fluid on the surface of the conductive members. This improved structure makes it possible to provide a battery pack having enhanced heat exchange performance between the conductive members and the cooling fluid.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a battery pack 1 according to a first exemplary embodiment with reference to FIG. 1 to FIG. 3.

Figure 1:
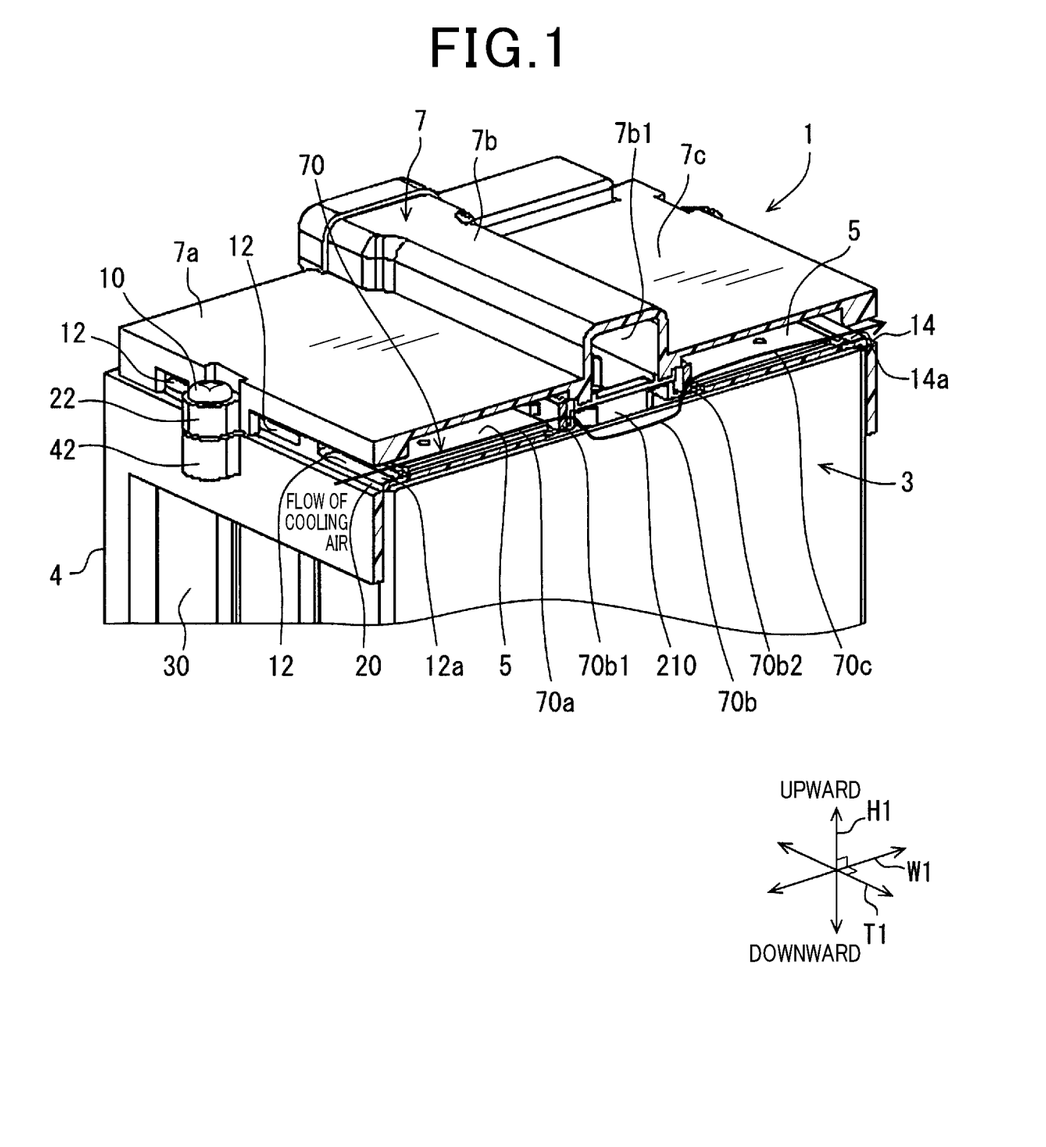
FIG. 1 is a perspective view showing a partial cross section of a cooling fluid passage formed in a battery pack according to a first exemplary embodiment of the present invention.

FIG. 1 is a perspective view showing a partial cross section of a cooling fluid passage 70 formed in the battery pack 1 according to the first exemplary embodiment. In FIG. 1 to FIG. 3 representing the first exemplary embodiment, and FIG. 4 to FIG. 8 representing second to fifth exemplary embodiment which will be explained later, reference character T1 indicates a stacking direction of the battery cells 30 (hereinafter, referred to as the "cell stacking direction T1") along which the battery cells 30 are stacked. Reference character W1 indicates a width direction of the battery cells 30 (hereinafter, referred to as the "cell width direction W1"). W1 also indicates a fluid flow direction in which cooling fluid flows. Reference character H1 indicates a height direction of the battery cells 30 (hereinafter, referred to as the "cell height direction H1"). The cell stacking direction T1 of the battery cells 30 is also a thickness direction of the battery cells 30 (hereinafter, referred to as the "cell thickness direction") of a rectangular shape.

The cell width direction W1 of the battery cells 30 is perpendicular to the cell height direction H1 of the battery cells 30, and is also perpendicular to the cell height direction H1 of the battery cells 30. In the structure of the battery pack 1, the cell height direction H1 of the battery cells 30 corresponds to a vertical direction of the battery pack 1.

It is possible to apply the battery pack 1 according to the first exemplary embodiment to various types of electronic devices having plural battery cells. For example, those electronic devices include devices which have a storage battery, computers such as microcomputers, and various types of vehicles.

In the following explanation, the battery pack 1 according to the first exemplary embodiment is applied to a hybrid vehicle equipped with an internal combustion engine and an electric motor. The electric motor in the hybrid vehicle is driven by electric power of the storage battery.

The battery pack 1 has battery casings 4, the plural battery cells 30, a bus bar casing 2 and a cover member 7. The cover member 7 is fitted to the bus bar casing 2 or the battery casings 4. The plural battery cells 30 are accommodated in the inside of the battery casing 4. The bus bar casing 2 is a supporting member capable of supporting the bus bars 5.

The battery pack 1 has plural battery stacks 3. The predetermined number of the battery cells 30 are arranged and stacked in the cell stacking direction T1 in each of the battery stacks 3. The battery cells 30 forming each battery stack 30 are electrically connected in series by bus bars 5. The bus bars 5 will be explained later.

Figure 2:
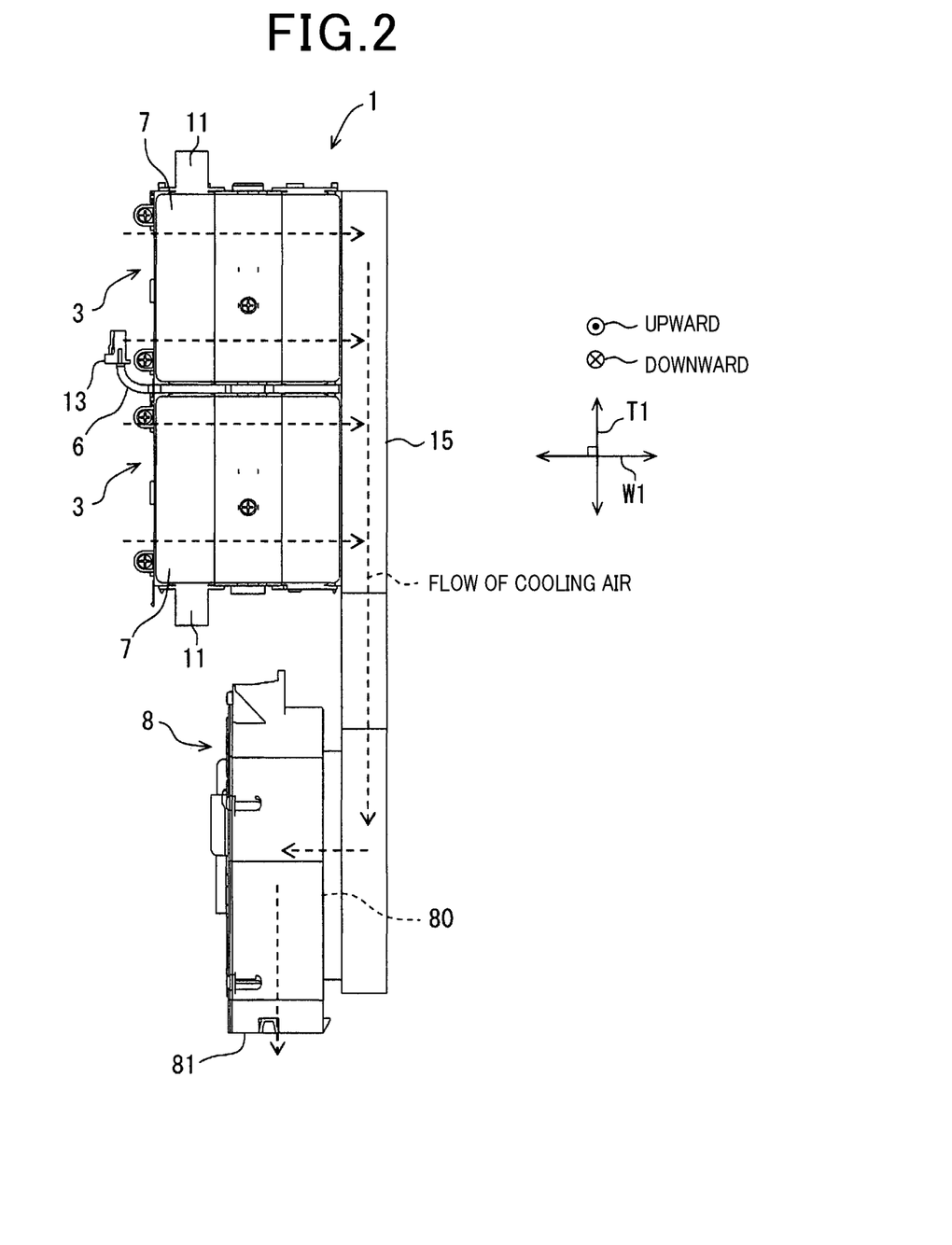
FIG. 2 is a plan view of the battery pack and an air supply device 8 according to the first exemplary embodiment of the present invention.

FIG. 2 is a plan view of the battery pack 1 and an air supply device 8 according to the first exemplary embodiment. As shown in FIG. 2, the two battery stacks 3 are arranged along the cell stacking direction T1 and electrically connected together. The battery casings 4, which is arranged adjacently from each other, are assembled together to one assembly because one battery casing 4 has a claw portion, and the other battery casing 4 has through-hole parts. The claw portion of one battery casing 4 is fitted to the through-hole parts of the other battery casing 4 to form the assembly. The claw portion and the through-hole parts are formed in the battery casing 4 and/or the bus bar casings 2.

Connectors 11 are arranged at both ends of the two battery stacks 3. Each connector 11 has a final positive electrode terminal and a final negative electrode terminal therein. Each battery cell 30 is a nickel hydrogen rechargeable battery, a lithium ion battery, or organic radical battery. The battery cells 30 are accommodated in the corresponding battery casing 4, and the battery pack 1 having the battery cells 30 is arranged under a passenger seat of a vehicle, a space between the rear seat and a trunk part in the rear of the vehicle, or a space between the driver seat and the passenger seat, etc.

Each of the plural battery cells 30 in the battery pack 1 is a unit battery. For example, each battery cell 30 is covered with an outer casing. The outer casing is made of aluminum, and has a positive electrode terminal 30a and a negative electrode terminal 30b. The positive electrode terminal 30a upwardly projects from one end surface of the outer casing of each battery cell 30.

The positive electrode terminal 30a and the negative electrode terminal 30b are formed on the same end surface of the outer casing of the battery cell 30.

The battery pack 1 has the predetermined number of the bus bars 5 through which the positive electrode terminals 30a and the negative electrode terminals 30b in the overall battery cells 30 are electrically connected together in series.

Each of the bus bars 5 is a conductive member made of conductive material. Each of the bus bars 5 is produced by press working so as to have two plate parts 50, and fin parts. The fin parts are formed to increase the heat transfer area of the battery cell 30. The electrode terminals in each battery cell 30 are composed of the positive electrode terminal 30a and the negative electrode terminal 30b As shown in FIG. 3, a safety valve 30c is formed in the outer casing of each of the battery cells 30. That is, the safety valve 30c is formed between the positive electrode terminal 30a and the negative electrode terminal 30b, and breaks when the battery cell 30 enters an abnormal state, and an inside pressure of the battery cell 30 exceeds a predetermined pressure. For example, the safety valve 30c is made of a thin metal film, and an aperture part is formed in the end surface of the outer casing of the battery cell 30. The aperture part is covered with the safety valve 30c made of a thin metal film. When the inside pressure of the battery cell 30 exceeds the predetermined pressure, the thin metal film of the safety valve 30c breaks, and in the battery cell 30 is externally discharged through the safety valve 30c. This reduces the inside pressure of the battery cell 30, and prevents the battery cell 30 from breaking.

The battery casing 4 is a box member having a box shape, which is capable of accommodating the entire battery cells 30. The battery casing 4 has accommodating chambers. In the battery casing 4, the number of the accommodating chambers corresponds to the number of the battery cells 30 to be accommodated therein. The accommodating chambers are arranged along the cell stacking direction T1 of the battery cells 30. The accommodating chambers are partitioned from each other by partition walls. The partition walls are arranged at predetermined intervals. The partition walls in the battery casing 4 support the outer casings of the battery cells 30. The battery casing is made of synthetic resin which contains polypropylene, filler, talc, etc. for example.

The battery casing 4 is composed of a bottom plate and four side plates. The four side plates are vertically arranged on the bottom plate. Each of the side plates has plural mounting parts. The battery pack 1 is fixed to a vehicle through the plural mounting parts of the side plate by using fixing members such as bolts and nuts.

The battery casing 4 has an opening part at an upper side thereof. The opening part is surrounded by the four side plates. That is, each of the battery cells 30 is inserted into the battery casing 4 through the opening part formed at the upper side of the battery casing 4. In more detail, each battery cell 30 is inserted from the surface of each battery cell 30, which is opposite to the surface on which the positive electrode terminal 30a, the negative electrode terminal 30b and the safety valve 30c are arranged, into the inside of the battery casing 4 through the opening part and is arranged at a predetermined location between the adjacent partition walls. One pair of the side plates are arranged in the cell width direction W1 at both sides of the battery cell 30. The other pair of the side plates are arranged in the cell stacking direction T1 in which the plural battery cells 30 are stacked. That is, the other pair of the side plates of the battery casing 4 are located at both ends of the battery cells 30 in the cell thickness direction.

It is possible to arrange the bus bar casing 2 on the opening part of the battery casing 4 so as to cover the opening part. The bus bar 5 is accommodated in the corresponding bus bar casing 2.

The battery cell 30 is accommodated in the corresponding accommodating chamber so that the positive electrode terminal 30a and the negative electrode terminal 30b of the battery cell 30 are externally exposed through the opening part of the battery casing 4. The bus bar casing 2 is made of electrically insulating material so as to electrically insulate the bus bar 5 from the outer casing of the battery cell 30. For example, the bus bar casing 2 is arranged to cover the upper surface of the outer casing of the battery cell 30. The bus bar casing 2 is made of synthetic resins which contain polypropylene, filler, talc, etc. for example.

The bus bar casing 2 accommodates the bus bars 5 which are arranged at both sides of a duct part 7b in the cell width direction W1. The bus bars 5 electrically connect the battery cell 30 and the battery cells 30 which are adjacently arranged in the cell stacking direction T1 from each other. The upper surface of each battery cell 30 is electrically connected to the corresponding bus bar 2. This makes it possible to specify the location of the positive electrode terminal 30a and the negative electrode terminal 30b of the battery cell 30 in the cell height direction H1 of the battery casing 4.

The bus bar 5 electrically connects the different electrode terminals of the adjacent battery cells 30 together. For example, the bus bar 5 electrically connects the positive electrode terminal 30a of one battery cell 30 and the negative electrode terminal 30b of the other battery cell 30, which are adjacently arranged. The electrical connection between the positive electrode terminal 30a and the negative electrode terminal 30b of the adjacent battery cells 30 are formed by using ultrasonic welding, laser welding, arc welding, etc. The bus bars 5 and the battery cells 30 are electrically connected together through the two plate parts 50, the positive electrode terminal 30a and the negative electrode terminal 30b.

Figure 3:
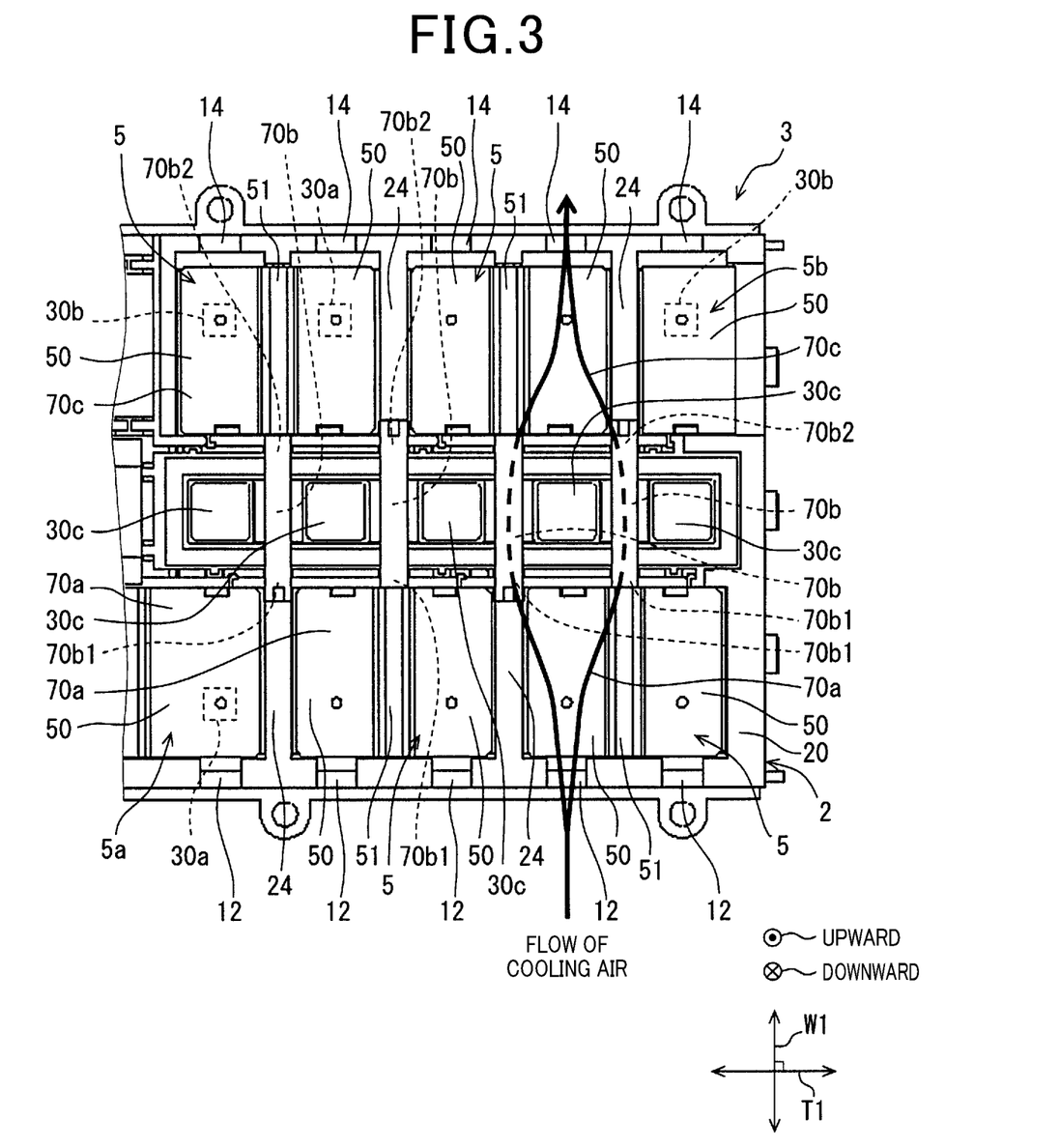
FIG. 3 is a plan view showing the cooling fluid passage, bus bars, and safety valves in the battery pack according to the first exemplary embodiment of the present invention.

FIG. 3 is a plan view showing the cooling fluid passage 70, bus bars 5, and safety valves 30c in the battery pack 1 according to the first exemplary embodiment. As shown in FIG. 3, in the battery casing 4, the positive electrode terminal 30a of the battery cell 30, which is located at one end of the battery assembly composed of the battery cells 30, is electrically connected to a bus bar 5a. The bus bar 5a has the plate parts 50. The end part of the bus bar 5a is electrically connected to the final electrode terminal in the connector 11 (see FIG. 2). This final electrode terminal in the connector 11 and is electrically connected to an outside power supply section.

The negative electrode terminal 30b of the battery cell 30 located at the one end in the cell width direction W1 is electrically connected to the positive electrode terminal 30a of the adjacent battery cell 30 through the bus bar 5. The battery cells 30 which are stacked in the cell stacking direction T1 are connected together in series by the bus bar 5.

The negative electrode terminal 30b of the battery cell 30 located at the other end of the battery stack 3 in the cell stacking direction T1 is electrically connected to the bus bar 5b having the plate part 50. The end part of the bus bar 5b is electrically connected to the adjacent battery stack 3. At the battery stack 3 located at the other end, the negative electrode terminal 30b of the battery cell 30, which is located at the other end of the battery stack 3, is electrically connected to the bus bar having the plate parts 50.

The end part of this bus bar is electrically connected to the final negative electrode terminal in the connector 11 (see FIG. 2). This final negative electrode terminal in the connector 11 is electrically connected to the outside power supply section.

As previously described, the bus bars arranged as the total electrode terminals of the battery pack 1 at both ends of the battery pack 1 are electrically connected to a current control circuit (omitted from the drawings). This current control circuit is composed of relays, etc., for example.

In a step of connecting the positive electrode terminal 30a of one battery cell 30 to the negative electrode terminal 30b of the other battery cell 30, which are adjacently arranged, by using the corresponding bus bar 5, each battery cell 30 is inserted into the battery casing 4 while the end surface of each battery cell 30, which is opposite to the other end surface on which the electrode terminals are formed, is inserted into the battery casing 4. Each of the battery cells 30 is accommodated in, and supported by the corresponding accommodating chamber through the opening part of the battery casing 4.

Next, the bus bar casing 2 is fitted to the assembly of the battery casing 4 and the plural battery cells 30.

In the assembly of the battery casing 4, the bus bar casing 2 and the battery cells 30, the corresponding bus bars 5 are arranged at predetermined locations, respectively, which correspond to the electrode terminals which are exposed through the opening parts formed in a base part 20 of the bus bar casing 2, as shown in FIG. 3. This makes it possible to support the bus bars 5 by the bus bar casing 2 so that the plate parts 50 are arranged in contact with the electrode terminals of the battery cells 30. After this step, each contact part at which the plate parts 50 and the electrode terminals are in contacted together is welded so as to electrically connect each of the bus bars 5 and the electrode terminals together.

Next, the bus bar casing 2 and the bus bars 5 are covered at a predetermine location with the cover member 7 (see FIG. 1 and FIG. 2). The cover member 7 is assembled with the battery stack 3, the battery casing 4 and the bus bar casing 2 by fastening bolts and nuts together in through-hole parts formed in an assembly section 42 of the battery casing 4 and in through-hole parts formed in an assembly section 22 of the cover member 7.

The battery pack 1 according to the first exemplary embodiment has the predetermined number of voltage detection lines 6. For example, each of the voltage detection lines 6 is formed between the battery cells 30, as shown in FIG. 2. The voltage signals are transmitted to the control device in a battery management unit through the voltage detection lines 6. That is, the voltage detection lines 6 are voltage detection members connected to the bus bars 5 so as to detect electric signals regarding voltage information such as a voltage of each of the battery cells 30.

The voltage detection line 6 is used for detecting an electrical signal regarding the battery information of the battery pack 1. The predetermined part of each of the bus bars 5 is connected to the control device in the battery management unit through the voltage detection lines 6. It is acceptable to arrange a part of each of detection members such as the voltage detection lines 6 in the inside of the bus bar casing 2. In this structure, for example, a specific part of the voltage detection line 6, from one end part thereof connected to the bus bar 5 to the other end part thereof connected to the connector terminal is accommodated in the bus bar casing 2. It is also acceptable to arrange the detection members such as the voltage detection lines 6 along the outer surface of the bus bar casing 2.

As shown in FIG. 2, the voltage detection line 6 extends from the connection part of the bus bar 5 to a connector terminal in a battery side connector 13. That is, each voltage detection line 6 is a communication line extended from the connection part of the bus bar 5 to the connector terminal of the battery side connector 13.

The end part of the voltage detection line 6 and an output connector terminal in the battery side connector 13 are fixed together by caulking or welding. The battery side connector 13 is electrically connected to an input connector terminal which is one of input signal lines in the control device.

It is possible to detect a voltage difference of the battery cells 30 in the battery stacks 3 on the basis of an electrical signal transmitted through the voltage detection line 6. When the input connector terminal is connected to the output connection terminal in the battery side connector 13, the detected voltage difference of the battery cells 30 in the battery stack 3 is transmitted to the control device in the battery management unit through the output connection terminal in the battery side connector 13.

The battery management unit is one example if a battery control unit for executing the control process of the battery pack 1, i.e. for monitoring and managing at least a state of charge (SOC) of the battery stack 3 composed of the predetermined number of the battery cells 3.

Further, the battery management unit monitors a current, a voltage and a temperature of each battery stack 3. It is also acceptable for the battery management unit to detect occurrence of abnormality of the battery stack 3 and to detect a leak current of the battery stack 3. The battery management unit communicates with various types of electric control units mounted on a vehicle.

It is acceptable for the battery management unit to receive signals representing a magnitude of a current detected by a current sensor, and/or to perform the control of a main relay and a pre-charged relay, etc.

For example, when the battery cell 30 is in the output state, the battery cell 30 supplies electric power and externally outputs a current, and the battery cell 30 generates a large amount of heat energy therein. In addition, the battery cell 30 generates heat energy during its input state in which the battery cell 30 is charged.

The battery management unit continuously monitors a temperature of the battery cell 30, and adjusts the operation of a cooling air supply device (or a cooling fluid supply device) on the basis of the detected temperature of the battery cell 30. For example, the battery management unit generates and transmits, to a motor of a cooling fan device 8, a control signal representing a voltage having an optional duty ratio within a range of 0% to 100% of the maximum voltage so as to adjust a rotation speed of the cooling fan device 8. It is possible for the battery management unit to adjust the rotation speed of the cooling fan device 8 on the basis of the supplied voltage so as to adjust, without steps, a supplying amount for cooling air as cooling fluid to the battery cells 30.

The voltage detection line 6 is connected to the connection section of the bus bar 5 and arranged in the cell width direction W1. The voltage detection line 6 is arranged between the bus bars 5 which are adjacently arranged in the cell stacking direction T1.

As shown in FIG. 3, the base part 20 of the bus bar casing 2 has plural bus bar wall parts 24 which extend in the cell width direction W1. Each bus bar wall part 24 is arranged between the adjacent bus bars 5 which are adjacently arranged in the cell stacking direction T1. Each bus bar wall part 24 having this structure makes it possible to electrically insulate the one bus bar 5 from the other bus bar 5 which are adjacently arranged from each other.

It is acceptable to arrange the bus bar wall part 24 so as to accommodate the corresponding voltage detection line 6 which extends from the adjacent bus bar 5 and guides the voltage detection line 6 to the battery side connector 13.

As shown in FIG. 1, the duct part 7b is arranged at a central part in the cell width direction W1 in the cover member 7, Further, the duct part 7b has a gas discharge passage 7b1 formed along the cell stacking direction T1. The gas discharge passage 7b1 communicates with the safety valve 30c, and crosses with the cooling fluid passage 70 at the central part in the cell width direction W1 of the cooling fluid passage 70.

The bus bar wall parts 24 are divided into plural groups, and each of the groups has a predetermined number of the bus bar wall parts 24. The groups of the bus bar wall parts 24 are arranged at predetermined intervals in the cell width direction W1 at both sides of the gas discharge passage 7b1. The bus bar 5 is arranged in the area at predetermined intervals.

The battery pack 1 has the cooling fluid passage 70 through which cooling fluid, for example cooling air, flows so as to cool the battery cells 30, as shown in FIG. 1. The cover member 7 is arranged so as to form the cooling fluid passage 70 between the bus bars 5. The cooling fluid flowing in the cooling fluid passage 70 is in contact with the bus bars 5 and cools heat energy of the bus bars 5. The supplied cooling fluid reduces a temperature of the bus bars 5.

The cover member 7 is made of synthetic resin containing polypropylene, filler, talc, etc. for example. The cover member 7 is formed and arranged to allow the cooling fluid to flow on the surface of the bus bars 5 so as to radiate heat energy from the bus bars 5.

As shown in FIG. 1, the cooling fluid passage 70 has an inlet part 12 and an outlet part 14. The inlet part 12 of the cooling fluid passage 70 is formed in a wall part of the bus bar casing 2 at an upstream side of the cooling fluid passage 70. On the other hand, the outlet part 14 of the cooling fluid passage 70 is formed in a wall part of the bus bar casing 2 at a downstream side of the cooling fluid passage 70. The inlet part 12 and the outlet part 14 of the cooling fluid passage 70 are open i.e. through holes formed in the wall parts of the bus bar casing 2.

The cooling fan device 8 is one example of fluid drive devices capable of generating a flow of coolant in the cooling fluid passage 70 to forcedly cool a target such as the bus bars 5 and the battery cells 30. An inlet part of the cooling fan device 8 is communicated with the outlet part 14 of the cooling fluid passage 70 through a connection duct 15 (see FIG. 2). It is possible to use, as cooling fluid, air, various types of gases, water, coolant, for example, The cover member 7 has a specific shape to cover the overall surface of the electrode terminals on the bus bars 5 in the battery stacks 3 in the battery pack 1.

The cover member 7 has an upstream side ceiling part 7a, a downstream side ceiling part 7c and an intermediate ceiling part. The upstream side ceiling part 7a of the cover member 7 is arranged to face the bus bar 5 closed to the inlet part 12 of the cooling fluid passage 70. The downstream side ceiling part 7c of the cover member 7 is arranged to face the bus bar 5 which is apart from the inlet part 12 of the cooling fluid passage 70. Through the intermediate ceiling part, the upstream side ceiling part 7a is connected to the downstream side ceiling part 7c.

The cooling fluid passage 70 is composed of an upstream side passage 70a, a downstream side passage 70c and an intermediate communication passage 70b. The upstream side passage 70a is formed between the upstream side ceiling part 7a and the upstream side bus bar 5. The downstream side passage 70c is formed between the downstream side ceiling part 7c and the downstream side bus bar 5. The upstream side passage 70a is communicated with the downstream side passage 70c through the intermediate communication passage 70b.

The upstream side ceiling part 7a is a plate section which forms the upstream side passage 70a of a flat rectangular shape. The upstream side passage 70a of a flat rectangular shape corresponds to the upstream side of the cooling fluid passage 70 formed between the battery stack 3 and the mounting surface of the bus bars 5 on the battery stack 3.

The intermediate ceiling part of the cover member 7 corresponds to the duct part 7b of a semi-cylindrical shape. This intermediate ceiling part of the cover member 7 extends in the cell stacking direction T1 and is formed on both the upstream side ceiling part 7a and the downstream side passage 70c at the downstream side ceiling part 7c.

As shown in FIG. 1 and FIG. 3, the intermediate communication passage 70b is a passage through which the upstream side passage 70a and the downstream side passage 70c communicate together, and the intermediate communication passage 70b is arranged around a communication duct 210. That is, the intermediate communication passage 70b is arranged, externally around the communication duct 210, from the upstream side ceiling part 7a to the downstream side passage 70c.

The intermediate communication passage 70b is crossing the gas discharge passage 7b1 and arranged at the location closer to the battery cells 30 side than the location of the gas discharge passage 7b1 side. Accordingly, as shown in FIG. 1, the cooling fluid passage 70 extends along the bus bar mounting surface in the inside of the upstream side ceiling part 7a, and further extends around the communication duct 210, and extends along the bus bar mounting surface in the inside of the downstream side ceiling part 7c.

The communication duct 210 has a passage therein to communicate the gas discharge passage 7b1 with the safety valve 30c of each of the battery cells 30. When abnormality occurs in the battery cell 30, gas inside of the battery cell 30 is discharged from the safety valve 30c and flows to the gas discharge passage 7b1 through the passage formed in the communication duct 210, and externally discharged through the duct part 7b. The duct part 7b has a semi-cylindrical shape extending in the cell stacking direction T1. The duct part 7b communicates with the upstream side ceiling part 7a and the downstream side ceiling part 7c of the cover member 7 at both end parts of the side walls of the duct part 7b.

The duct part 7b having the gas discharge passage 7b1 therein has excellent heat resistance properties. Even if the inside of the cell battery 30 enters in the abnormal state, for example, the gas inside of the battery cell 30 is at an extreme high-pressure, the safety valve 30c is broken, and the gas inside of the battery cell 30 is discharged through the broken safety valve 30c, the gas discharge passage 7b1 of the duct part 7b does not melt and break, and can maintain its shape. Thus, the duct part 7b has the excellent heat resistance properties.

The upstream side passage 70a is arranged between the cover member 7 and the bus bar 5 located at the upstream side. The cooling fluid, for example cooling air, flows in the upstream side passage 70a. The upstream side passage 70a is one of the cooling fluid passages. The downstream side passage 70c is arranged between the cover member 7 and the bus bar 5 located at the downstream side. The cooling fluid flows in the downstream side passage 70c. The downstream side passage 70c is also one of the cooling fluid passages.

A lower side wall surface 12a is one of the wall surfaces forming the inlet part 12 of the upstream side passage 70a of the cooling fluid passage 70, and is closest to the battery cell 30. This lower side wall surface 12a corresponds to the upstream side wall surface forming the inlet part 12 of the upstream side passage 70a of the cooling fluid passage 70. The lower side wall surface 12a is arranged closer to the battery cell 30 than the surface of the bus bar 5 side. Accordingly, at least a part of the upstream side wall surfaces is arranged closer to the battery cell 30 side than the surface of the bus bar 5.

A lower side wall surface 14a is one of the wall surfaces forming the outlet part 14 of the downstream side passage 70c of the cooling fluid passage 70, and is closest to the battery cell 30 side. This lower side wall surface 14a corresponds to the downstream side wall surface forming the outlet part 14 of the upstream side passage 70*a* of the cooling fluid passage 70. The lower side wall surface 14*a* is arranged closer to the battery cell 30 than the surface of the bus bar 5. Accordingly, at least a part of the downstream side wall surfaces is arranged closer to the battery cell 30 side than the surface of the bus bar 5.

A lower side wall surface 70*b*1, forming the inlet part of the intermediate communication passage 70*b*, is arranged closest to the battery cell 30 side. This lower side wall surface 70*b*1 corresponds to the downstream side wall surface which forms the outlet part of the upstream side passage 70*a* of the cooling fluid passage 70. The lower side wall surface 70*b*1 is arranged closer to the battery cell 30 than to the surface of the bus bar 5. Accordingly, at least a part of the downstream side wall surfaces forming the upstream side passage 70*a* is arranged closer to the battery cell 30 side than to the surface of the bus bar 5.

A lower side wall surface 70*b*2, forming the outlet part of the intermediate communication passage 70*b*, is arranged closest to the battery cell 30 side. This lower side wall surface 70*b*2 corresponds to the upstream side wall surface forming the inlet part of the downstream side passage 70*c* of the cooling fluid passage 70. The lower side wall surface 70*b*2 is arranged closer to the battery cell 30 side than to the surface of the bus bar 5 side. Accordingly, at least a part of the upstream side wall surfaces forming the downstream side passage 70*c* is arranged closer to the battery cell 30 side than to the surface of the bus bar 5. This structure makes it possible for at least a part of the wall surfaces forming the intermediate communication passage 70*b* is arranged closer to the battery cell 30 side than to the surface of the bus bar 5 side.

As shown in FIG. 3, in the cell stacking direction T1 of the battery cells 30, both of the inlet part 12 of the upstream side passage 70*a* and the outlet part 14 of the downstream side passage 70*c* are arranged at the locations, which include the central part in the thickness direction of each battery cell 30. In other words, both of the inlet part 12 of the upstream side passage 70*a* and the outlet part 14 of the downstream side passage 70*c* are arranged to include the central part of the plate part 50 of the bus bar 5 with which the electrode terminal of the battery cell 30 is in contact. This arrangement makes it possible to allow cooling fluid in the upstream side passage 70*a* and the downstream side passage 70*c* to flow on the surfaces of the electrode terminals of the battery cells 30.

The intermediate communication passage 70*b* is arranged at the location which includes both sides of the battery cell 30 in the cell stacking direction T1. As shown in FIG. 3, the intermediate communication passage 70*b* is arranged to overlap the both sides in the cell stacking direction T1 of the battery cell 30.

The intermediate communication passage 70*b* is a passage arranged both sides of the safety valve 30*c* when viewed on a plane view. The intermediate communication passage 70*b* is formed by the bus bar casing 2, and has a tunnel shape extending along the cell width direction W1. The intermediate communication passage 70*b* is surrounded by the bus bar casing 2, excepting the end surface through which the electrode terminals of the battery cells 30 are externally exposed.

The lower side wall surface 70*b*1 and the lower side wall surface 70*b*2 correspond to projection surfaces of the electrode terminals of the battery cells 30 and are arranged closer to the battery cell 30 side than the surface of the bus bar 5. It is acceptable for the intermediate communication passage 70*b* to have a cross section of a rectangle shape which is surrounded by the bus bar casing 2. In this structure, the lower side wall surface 70*b*1 and the lower side wall surface 70*b*2 correspond to the base part 20 of the bus bar casing 2.

As shown in FIG. 1 and FIG. 3, the cooling fluid is introduced into the inside of the cooling fluid passage 70 through the inlet part 12 by suction force of the air supply device 8. Because the front end surfaces of the bus bar wall parts 24 are arranged close to the cover member 7, it is difficult for the cooling fluid to flow on the surfaces of the bus bar wall parts 24. After being introduced into the inside of the upstream side passage 70*a*, the cooling fluid flows along the lower side wall surface 12*a* of the inlet part 12, which is arranged closer to the battery cell 30 side than to the bus bar 5 side, and flows on the surface of the contact part at which the electrode terminals and the bus bars 5 at the upstream side close to the inlet part 12 of the cooling fluid passage 70. When the cooling fluid flows toward the upstream side of the upstream side passage 70*a*, the cooling fluid approaches the battery cells 30 and the surfaces of the bus bars at the upstream side. This makes it possible to promote the flow of the cooling fluid along the surfaces of the bus bars 5.

As designated by the arrow in FIG. 3, when the cooling fluid is introduced into the intermediate communication passage 70*b* from the upstream side passage 70*a* along the lower side wall surface 70*b*1, the cooling fluid flows along the cell width direction W1 at both sides in the cell stacking direction T1 of the battery cell 30 while approaching the battery cells 30 than the surface of the bus bars 5. In other words, as designated by the arrows in FIG. 3, the cooling fluid enters the upstream side passage 70*a* from the central part of the battery cell 30 in its thickness side, and the flow of the cooling fluid is divided into both sides of the battery cells 30.

When the cooling fluid flows in the intermediate communication passage 70*b* after divided into both sides of the battery cell 30, the cooling fluid moves downwards, i.e. toward the location approaching the battery cell 30 side than the location of the surface of the bus bar 5 side, and then flows downward in the cell width direction W1 along the side surfaces of the communication duct 210. Because the cooling fluid approaches the battery cells 30 side at the intermediate communication passage 70*b* from the upstream side passage 70*a*, this structure makes it possible to promote the flow of the cooling fluid to approach the surfaces of the bus bars 5 and to flow on the surfaces of the bus bars 5.

When flowing from the intermediate communication passage 70*b* arranged at both sides of the battery cell 30 to the downstream side passage 70*c*, the cooling fluid flows along the lower side wall surface 70*b*2, and the cooling fluid flows apart from the battery cell 30, and flows upward, for example, toward the upper side of the battery cell 30. Further, the cooling fluid flows downward into the outlet part 14 of the upstream side passage 70*a* of the cooling fluid passage 70. In other words, the cooling fluid flows downward from the intermediate communication passage 70*b* to be concentrated into the surface of the contact part between the surface of the bus bar 5 and the electrode terminals of the battery cell 30. This structure makes it possible to allow the cooling fluid to flow more on the surface of the bus bar 5 in the downstream side passage 70*c*, and to allow the cooling fluid in the downstream side passage 70*c* to be in contact with the bus bars at the downstream side.

The cooling fluid in the downstream side passage 70*c* flows along the lower side wall surface 14*a* (see FIG. 1) of the outlet part 14 when being externally discharged from the cooling fluid passage 70 through the outlet part 14. That is, the cooling fluid moves downward to the location close to the battery cell 30 side when compared with the flow of the cooling fluid on the surface of the bus bar 5. This structure makes it possible to promote the flow of the cooling fluid along the surface of the bus bar 5 located at the downstream side because the cooling fluid approaches the battery cell 30 side at the downward side in the downstream side passage 70*c*.

According to the structure of the battery pack 1 of the first exemplary embodiment previously described, the cooling fluid flows along the lower side wall surface 12*a* of the inlet part 12, the lower side wall surface 70*b*1 of the intermediate communication passage 70*b*, and the lower side wall surface 14*a* of the outlet part 14 in order. This improved structure makes it possible to provide a battery pack 1 having excellent features capable of promoting heat exchange between the cooling fluid and the bus bars 5 arranged at the upstream side, and of promoting heat exchange between the cooling fluid and the bus bars arranged at the downstream side of the cooling fluid passage 70.

A description will now be given of the effects of the battery pack 1 according to the first exemplary embodiment.

The battery pack 1 has the bus bars 5, the battery stack 3 and the bus casing 2. The battery cells 30 are adjacently arranged in the cell stacking direction T1 and electrically connected to each other through the bus bars 5. The battery stack 3 is the assembly of the plural battery cells 30 electrically connected together through the bus bars 5. The bus bars 5 are supported by the bus casing 2. The battery pack 1 further has the cover member 7 which forms the cooling fluid passage 70 between the bus bars 5. Cooling fluid, for example cooling air, flows in the cooling fluid passage 70. At least a part of the upstream side wall surfaces which form the inlet part 12 of the cooling fluid passage 70 or at least a part of the downstream side wall surfaces which form the outlet part 14 of the cooling fluid passage 70 is arranged closer to the battery cell 30 side than to the surface of the bus bar 5.

According to the battery pack 1 of the first exemplary embodiment having the improved structure previously described, at least a part of the upstream side wall surfaces, which form the inlet part of the cooling fluid passage and arranged at the upstream side of the cooling fluid flow when compared with the location of the bus bar 5, is arranged closer to the battery cell 30 side than the surface of the bus bar 5. This improved structure of the battery pack 1 makes it possible to allow cooling fluid to be introduced into the cooling fluid passage 70 from the area closer to the battery cell 30 than the location of the bus bar 5, and to flow along the surface of the bus bar 5. It is accordingly possible for the structure of the battery pack 1 to have an excellent function to execute heat exchange between the cooling fluid and bus bars 5.

Further, according to the battery pack 1 of the first exemplary embodiment, at least a part of the downstream side wall surfaces, which form the outlet part of the cooling fluid passage and arranged at the downstream side of the cooling fluid flow than the location of the bus bar 5 side, are arranged at the location closer to the battery cell 30 side than the location of the surface of the bus bar 5. This improved structure of the battery pack 1 makes it possible to allow cooling fluid to be externally discharged. That is, the cooling fluid flows from the area closer to the battery cell 30 side, than the location of the bus bar 5 side, through the cooling fluid passage 70, flows along the surface of the bus bar 5, and is externally discharged. It is accordingly possible for the structure of the battery pack 1 to have the function of executing with high efficiency heat exchange between the cooling fluid and bus bars 5 because of allowing the cooling fluid to easily flow along the surface of the bus bar 5. Accordingly, it is possible for the structure of the battery pack 1 according to the first exemplary embodiment to increase the cooling capability for cooling the bus bars 5 through which the electrode terminals of the battery cells 30 are electrically connected together.

Still further, in the battery pack 1 according to the first exemplary embodiment, the positive electrode terminals 30*a* and the negative electrode terminals 30*b* of the battery cells 30 project on the same surface of the battery pack 1. Further, the battery pack 1 has the cooling fluid passage 70 formed between the cover member 7 and the battery stacks 3. This cooling fluid passage 70 is composed of the upstream side passage 70*a*, the intermediate communication passage 70*b* and the downstream side passage 70*c*. The upstream side passage 70*a* communicates with the downstream side passage 70*c* through the intermediate communication passage 70*b*. At least a part of the wall surfaces, which form the intermediate communication passage 70*b*, is arranged at the location closer to the battery cell 30 side than the location of the surface of the bus bar 5. Because the intermediate communication passage 70*b* is arranged at the location closer to the battery cell 30 side than the location of the surface of the bus bar 5, this improved structure makes it possible to promote generation of flow of the cooling fluid on the surface of the bus bar 5 by using the area arranged between the positive electrode terminal 30*a* and the negative electrode terminal 30*b*. Accordingly, this structure makes it possible to provide the battery pack 1 having a reduced size and the improved function capable of increasing the cooling capability for cooling the bus bars 5.

Still further, in the structure of the battery pack 1 according to the first exemplary embodiment, the cover member 7 has the duct part 7*b* which forms the gas discharge passage 7*b*1, for example, see FIG. 1, which communicates with the safety valve 30*c* of the battery cell 30. The intermediate communication passage 70*b* crosses the gas discharge passage 7*b*1 and is arranged at the location closer to the battery cell 30 side than the location of the gas discharge passage 7*b*1.

Because the intermediate communication passage 70*b* is arranged at the location more closer to the battery cell 30 side, than the location of the surface of the bus bar 5, at the downstream side of the gas discharge passage 7*b*1, this makes it possible to generate the cooling fluid to be in contact with the surfaces of the bus bars 5 and to allow the cooling fluid to flow on the surfaces of the bus bars 5 while using the dead area generated when the duct part 7*b* to be used for discharging gas is arranged.

Both the inlet part 12 of the upstream side passage 70*a* and the outlet part 14 of the downstream side passage 70*c* in the cooling fluid passage 70 are arranged at the location which includes the central part in the thickness direction of the battery cell 30. The intermediate communication passage 70*b* is arranged at the location which includes both sides of the battery cell 30 in the cell stacking direction T1. This improved structure allows the cooling fluid to flow from the inlet part 12 of the upstream side passage 70*a* located at the central part in the thickness direction of the battery cell 30 to both sides of the battery cell 30 while the cooling fluid flows diagonally across the surface of the bus bar 5. This flow of the cooling fluid makes it possible to generate a long flow passage of the cooling fluid on the surface of the bus bar 5 at the upstream side of the cooling fluid passage 70. Further, this flow of the cooling fluid makes it possible to improve the heat exchange between the cooling fluid and the bus bar 5 at the upstream side of the cooling fluid passage 70 because of easily generating the flow of the cooling fluid on the contact surface on which the bus bar 5 at the upstream side and the electrode terminals are in contact together.

Still further, the improved structure of the battery pack previously described allows the cooling fluid to diagonally flow on the surface of the bus bar 5 from both sides of the battery cell 30 toward the outlet part 14 of the downstream side passage 70c located at the central part in the thickness direction of the battery cell 30. This flow of the cooling fluid makes it possible to form a long flow passage on the surface of the bus bar 5 located at the downstream side of the cooling fluid passage 70. Still further, this flow of the cooling fluid makes it possible to easily generate the cooling fluid flowing on the contact part between the bus bar 5 at the downstream side and the electrode terminals of the battery cell. This makes it possible to improve the heat exchange between the cooling fluid and the bus bar 5 at the downstream side of the cooling fluid passage 70 in addition to the heat exchange at the upstream side of the cooling fluid passage 70.

Second Exemplary Embodiment

A description will be given of the battery pack according to the second exemplary embodiment with reference to FIG. 4.

Figure 4:
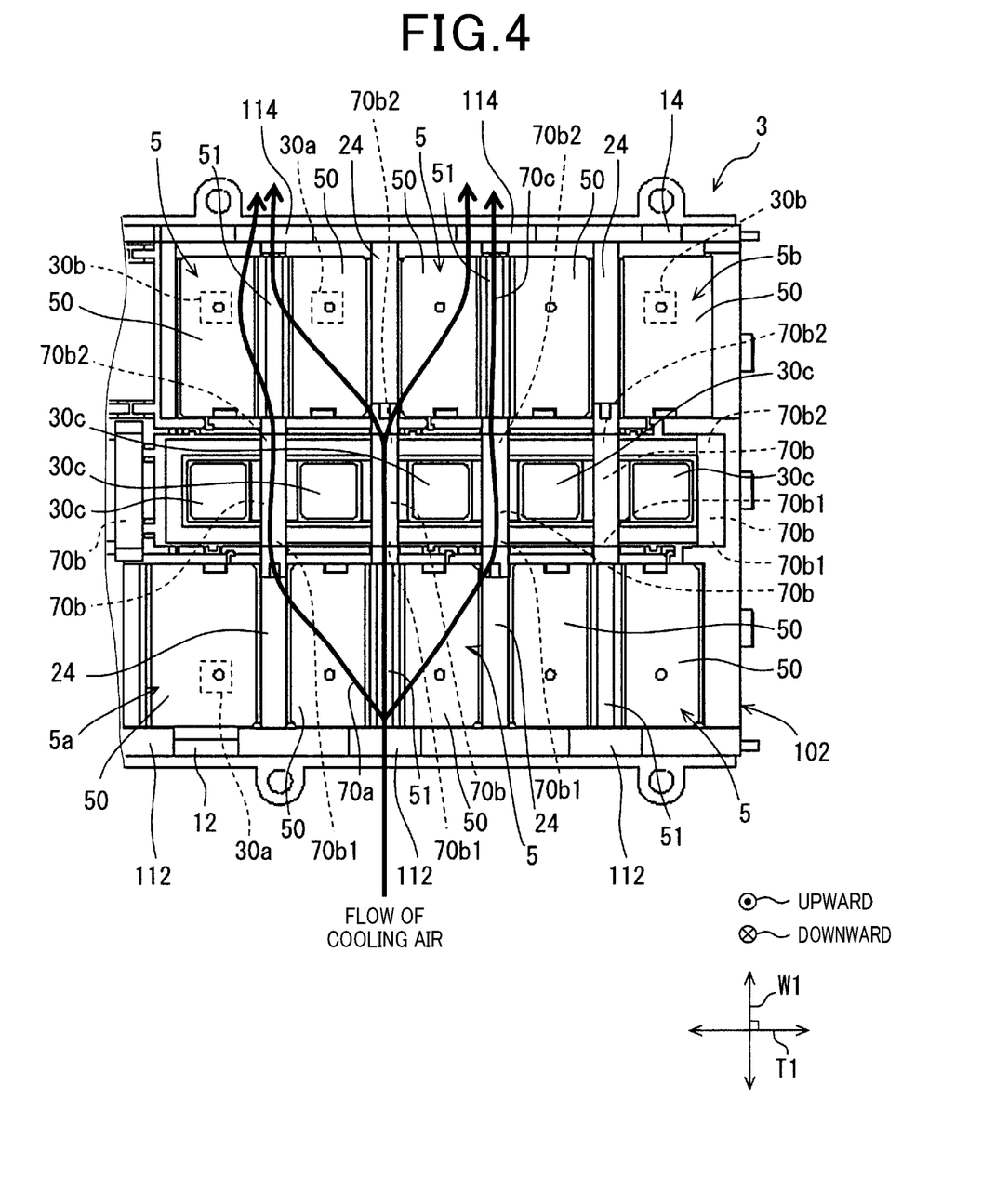
FIG. 4 is a plan view showing the cooling fluid passage, the bus bars, and the safety valves in the battery pack according to a second exemplary embodiment of the present invention.

FIG. 4 is a plan view showing the cooling fluid passage 70, the bus bars 5, and the safety valves 30c in the battery pack 1 according to the second exemplary embodiment. The cooling fluid passage 70 has the upstream side passage 70a, the intermediate communication passage 70b and the downstream side passage 70c.

In FIG. 4, the same components in the battery pack 1 between the first exemplary embodiment and the second exemplary embodiment will be referred to using the same reference numbers and characters. The explanation of the same components is omitted here for brevity because the same components have the same action and effects between the first exemplary embodiment and the second exemplary embodiment. The difference of the battery pack between the first exemplary embodiment and the second exemplary embodiment will be explained.

The cooling fluid passage 70 used in the battery pack 1 according to the second exemplary embodiment is different in structure from the cooling fluid passage 70 used in the battery pack 1 according to the first exemplary embodiment. In particular, the upstream side passage 70a in the battery pack 1 shown in FIG. 4 has an inlet part 112 which is different in structure from the inlet part 12 of the upstream side passage 70a in the battery pack 1 according to the first exemplary embodiment shown in FIG. 1.

Further, the downstream side passage 70c in the battery pack 1 shown in FIG. 4 has an outlet part 114 which is also different in structure from the outlet part 14 of the downstream side passage 70c in the battery pack 1 according to the first exemplary embodiment shown in FIG. 1.

As designated by the solid arrows in FIG. 4, both the inlet part 112 and the outlet part 114 which are formed in the bus bar casing 2 are arranged at the location which includes the central part of the bus bar 5 in the cell stacking direction T1. In other words, both the inlet part 112 and the outlet part 114 are arranged between the positive electrode terminal 30a and the negative electrode terminal 30b adjacently arranged from each other. This structure shown in FIG. 4 allows the cooling fluid in the upstream side passage 70a and the cooling fluid in the downstream side passage 70c to flow diagonally across the surfaces of the bus bars 5 (see the solid arrows shown in FIG. 4).

In the structure of the inlet part 112 of the upstream side passage 70a, the lower side wall surfaces, arranged at the location closest to the battery cell 30 side in the wall surfaces which form the inlet part 112, correspond to the upstream side wall surfaces which form the inlet part 112 of the cooling fluid passage. The lower side wall surfaces of the inlet part 112 are arranged at the location closer to the battery cell 30 side than the location of the surface of the bus bar 5.

In the structure of the outlet part 114 of the downstream side passage 70c, the lower side wall surfaces, arranged at the location closest to the battery cell 30 side in the wall surfaces which form the outlet part 114, correspond to the lower side wall surfaces which form the outlet part of the cooling fluid passage. The lower side wall surfaces of the outlet part 114 are arranged at the location closer to the battery cell 30 side than the location of the surface of the bus bar 5.

As shown in FIG. 4, the cooling fluid is sucked and introduced into the inside of the cooling fluid passage 70 through the inlet part 112 by suction force of the air supply device 8. After being introduced into the inside of the upstream side passage 70a, the cooling fluid flows along the lower side wall surface of the inlet part 112, and approaches the battery cell 30 side than the surface of the bus bar 5, and flows along the surface of the contact part between the bus bar 5 arranged closer to the inlet part 112 and the electrode terminals of the battery cell 30. As designated by the solid arrows in FIG. 4, when the cooling fluid flows from the upstream side passage 70a to the intermediate communication passage 70b, the cooling fluid flows along the lower side wall surface 70b1 and approaches the battery cell 30 side and flows at both sides of the battery cell 30 in the cell stacking direction T1.

As designated by the solid arrows shown in FIG. 4, the flow of the cooling fluid is divided into two flow directions. In the first flow direction of the cooling fluid, the cooling fluid flows from the inlet part 112 to the intermediate communication passage 70b along the surface of the bus bar 5 arranged at the upstream side of the battery pack 1 in the cell width direction W1. In the second flow direction, the cooling fluid flows from the inlet part 112 side to the intermediate communication passage 70b side while diagonally across the surface of the bus bar 5 arranged at the upstream side.

In other words, at the inlet part 112, the cooling fluid flows into the upstream side passage 70a through the central part of the bus bar 5, and the cooling fluid expands in the two directions, i.e. expands toward both sides of the bus bar 5 when viewed from the central part of the bus bar 5. Further, when flowing in the intermediate communication passage 70b after the flow of the cooling fluid has been divided into both sides of the battery cell 30, the cooling fluid flows approaching the battery cell 30 side than the surface of the bus bar 5 side, and flows downward in the cell width direction W1 along the side surfaces of the communication duct 210. Because the flow of the cooling fluid from the upstream side passage 70a to the intermediate communication passage 70b approaches the battery cell 30 side, this structure makes it possible to promote the cooling fluid to approach and flow along the surface of the bus bar 5 arranged at the upstream side.

When the cooling fluid flows from the intermediate communication passage 70b to the downstream side passage 70c in the battery pack, the cooling fluid flows along the lower side wall surface 70*b*2 apart from the battery cell 30 side, for example the cooling fluid flows upward. Further, the flow of the cooling fluid is divided into two directions, i.e. divided into the first flow direction and the second flow direction. In the first flow direction, the cooling fluid flows to the outlet part 114 on the surface of the bus bar 5 arranged at the downstream side in the cell width direction W1. In the second flow direction, the cooling fluid flows to the outlet part 114 diagonally across the surface of the bus bar 5. Accordingly, the cooling fluid flows downward from the intermediate communication passage 70*b* to the outlet part 114, which corresponds to the location of the central part of the bus bar 5.

When the cooling fluid in the downstream side passage 70*c* is externally discharged through the outlet part 114, the cooling fluid flows along the lower side wall surface of the outlet part 114. When the flowing downward in the cooling fluid passage 70 and is externally discharged through the outlet part 114, the cooling fluid flows along the lower side wall surface of the outlet part 114 which is close to the battery cell 30 side when compared with the case in which the cooling fluid flows along the surface of the bus bar 5.

When the cooling fluid, for example cooling air, flows in the cooling fluid passage 70, the structure of the battery pack 1 according to the second exemplary embodiment, as previously described, allows the cooling fluid to flow along the lower side wall surface of the inlet part 112, the lower side wall surface 70*b*1, the lower side wall surface 70*b*2, and the lower side wall surface of the outlet part 114.

In the battery pack 1 according to the second exemplary embodiment having the improved structure previously described shown in FIG. 4, the cooling fluid flows over a wide area on the surface of the bus bar 5 toward the intermediate communication passage 70*b* from the inlet part 112 of the upstream side passage 70*a* which is arranged at the central part of the bus bar 5. This structure makes it possible to form a long flow passage of the cooling fluid on the surface of the bus bar 5 arranged at the upstream side, and to allow the cooling fluid to flow in a wide flowing area on the surface of the bus bar 5 arranged at the upstream side. This structure makes it possible to provide improved heat exchange between the cooling fluid and the bus bar arranged at the upstream side.

Furthermore, in the battery pack 1 according to the second exemplary embodiment having the improved structure previously described shown in FIG. 4, the cooling fluid flows diagonally across the surface of the bus bar 5 arranged at the downstream side, from both sides of the battery cell 30, toward the outlet part 114 of the downstream side passage 70*c*. This structure makes it possible to allow the cooling fluid to flow in a wide flowing area on the surface of the bus bar 5 arranged at the downstream side. That is, this structure makes it possible to form a long flow passage of the cooling fluid on the surface of the bus bar 5 arranged at the downstream side, and to easily generate a wide flow area of the cooling fluid on the surface of the bus bar 5 arranged at the downstream side. This structure also makes it possible to provide improved heat exchange between the cooling fluid and the bus bar arranged at the downstream side.

Third Exemplary Embodiment

A description will be given of the battery pack according to the third exemplary embodiment with reference to FIG. 5 and FIG. 6. The battery pack according to the third exemplary embodiment is a modification of the battery pack 1 according to the second exemplary embodiment.

Figure 5:
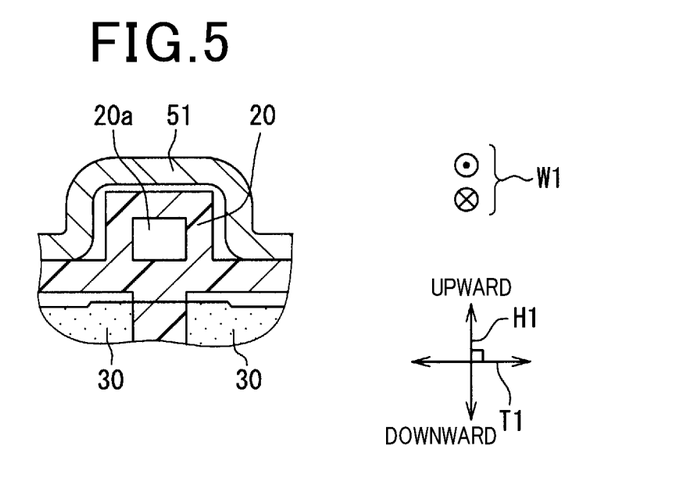
FIG. 5 is a perspective view showing a partial cross section of the cooling fluid passage formed in a rear part of a bent part in the battery pack according to a third exemplary embodiment of the present invention.

FIG. 5 is a perspective view showing a partial cross section of the cooling fluid passage 70 formed in a rear part of a bent part 51 in the battery pack according to the third exemplary embodiment. In FIG. 5, the same components in the battery pack 1 between the first to third exemplary embodiments will be referred to using the same reference numbers and characters. The explanation of the same components is omitted here for brevity because the same components have the same action and effects between the first to third exemplary embodiments. The difference of the battery pack between the third exemplary embodiment and the second exemplary embodiment will be explained.

The battery pack according to the third exemplary embodiment has a passage 20*a*. The passage 20*a* is formed in a rear part of a bent part 51. As shown in FIG. 5, a cross section of the bent part 51 has a curved shape. When compared with the plate part 50 of the bus bar 5 which is in contact with the electrode terminals of the battery cell 30, the bent part 51 is arranged at the location apart from the battery cell 30.

As shown in FIG. 5, the passage 20*a* is formed to penetrate in the base part 20 of the bus bar casing 2 in the cell width direction W1. The passage 20*a* communicates with the inlet part 12 or 112 of the upstream side passage 70*a*. It is preferable to form the passage 20*a* at the rear part of the bus bar 5 arranged at the upstream side, i.e. at the battery cell 30 side. The passage 20*a* also communicates with the intermediate communication passage 70*b*. This structure of the passage 20*a* makes it possible to supply the cooling fluid, onto the surface of the bus bar 5 arranged at the downstream side, which does not contain heat energy generated in the bus bar 5 arranged at the upstream side. Further, this structure of the passage 20*a* makes it possible to increase the heat exchange capability of the cooling fluid with the bus bar 5 arranged at the downstream side.

Further, because the passage 20*a* is surrounded by the base section 20 of the bus bar casing 2 made of resin material, the passage 20*a* is protected from heat by the base section 20 of the bus bar casing 2.

Figure 6:
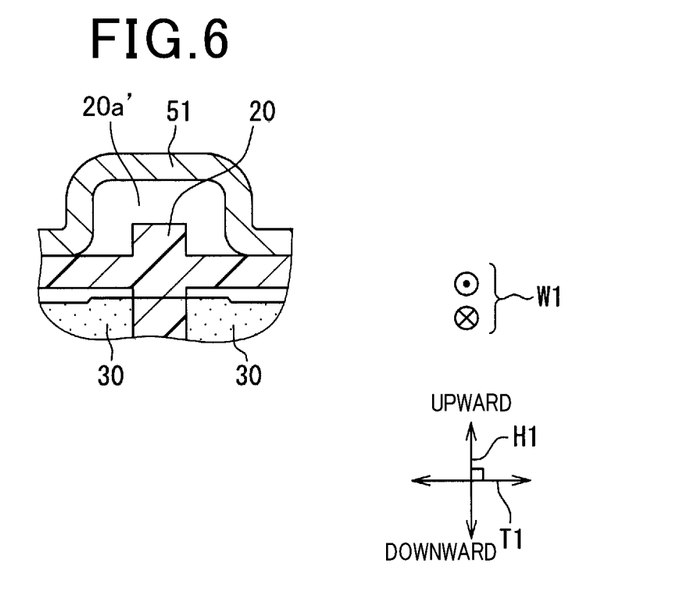
FIG. 6 is a perspective view showing a partial cross section of the cooling fluid passage having another structure formed in the rear part of the bent part in the battery pack according to the third exemplary embodiment of the present invention.

FIG. 6 is a perspective view showing a partial cross section of the cooling fluid passage 70 having another structure formed in the rear part of the bent part 51 in the battery pack according to the third exemplary embodiment. In FIG. 6, the same components in the battery pack 1 between the first to third exemplary embodiments will be referred to using the same reference numbers and characters. The explanation of the same components is omitted here for brevity because the same components have the same action and effects between the first to third exemplary embodiments.

It is acceptable for the passage 20*a* shown in FIG. 5 to have another shape. For example, it is possible to form a passage 20*a*' shown in FIG. 6 between the bent part 51 of the bus bar 5 and the base part 20 of the bus bar casing 2. That is, the passage 20*a*' is surrounded by the rear part of the bent part 51 and the base part 20 of the bus bar casing 2. As compared with the passage 20*a* shown in FIG. 5, the passage 20*a*' shown in FIG. 6 is not completely accommodated by the resin material of the base part 20. This structure makes it possible to promote the cooling of the vent part 51 of the bus bar 5, i.e. to cool both sides of the bent part 51 when cooling air as the cooling fluid is directly supplied to the rear surface of the bent part 51 in addition to supply the cooling air to the front surface of the bent part 51.

Fourth Exemplary Embodiment

A description will be given of the battery pack according to the fourth exemplary embodiment with reference to FIG. 7. The battery pack according to the fourth exemplary embodiment is a modification of the battery pack 1 according to the first exemplary embodiment.

Figure 7:
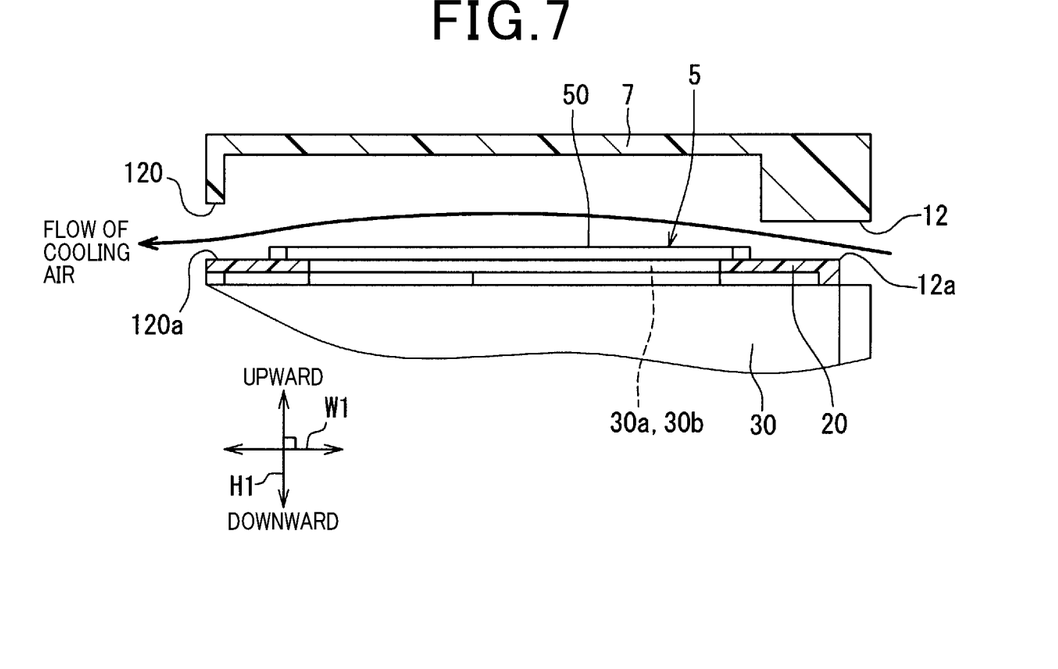
FIG. 7 is a view showing a partial cross section of an inlet part, an outlet part and the bus bars in the battery pack according to a fourth exemplary embodiment of the present invention.

FIG. 7 is a view showing a partial cross section of the inlet part 12, an outlet part 120 and the bus bars 5 in the battery pack 1 according to the fourth exemplary embodiment.

In FIG. 7, the same components in the battery pack 1 between the fourth exemplary embodiment and the first exemplary embodiment will be referred to using the same reference numbers and characters. The explanation of the same components is omitted here for brevity because the same components have the same action and effects between the fourth exemplary embodiment and the first exemplary embodiment. The difference of the battery pack between the fourth exemplary embodiment and the first exemplary embodiment will be explained.

In the structure of the battery pack according to the fourth exemplary embodiment, the lower side wall surface 12a of the inlet part 12 is arranged at the location closer to the battery cell 30 side than the surface of the bus bar 5 side, and a lower side wall surface 120a of an outlet part 120 is also arranged at the location closer to the battery cell 30 side than the surface of the bus bar 5 side. Further, the inlet part 12 is arranged at the location closer to the contact part between the bus bar 5 and the electrode terminal of the battery cell 30, than the outlet part 120. Still further, the inlet part 12 has the cross-sectional area which is smaller than the cross-sectional area of the outlet part 120, as shown in FIG. 7.

In the structure of the battery pack according to the fourth exemplary embodiment previously described, because one of the inlet part 12 and the outlet part 120, which is arranged close to the contact part between the bus bar 5 and the electrode terminal of the battery cell 30, has the cross-sectional small area which is smaller than the cross-sectional area of the other part, it is possible to increase the flow speed of the cooling fluid on the surface of the bus bar 5 at the location close to the outlet part 120. This structure makes it possible to increase the flow speed of the cooling fluid, for example cooling air, on the contact part between the bus bar 5 and the electrode terminals of the battery cell 30 because the electrode terminals of the battery cell 30 generates a large amount of heat energy. It is accordingly possible for the battery pack according to the fourth exemplary embodiment to have excellent heat radiation effect in the bus bar 5.

Fifth Exemplary Embodiment

A description will be given of the battery pack according to the fifth exemplary embodiment with reference to FIG. 8. The battery pack according to the fifth exemplary embodiment is a modification of the battery pack 1 according to the first exemplary embodiment.

Figure 8:
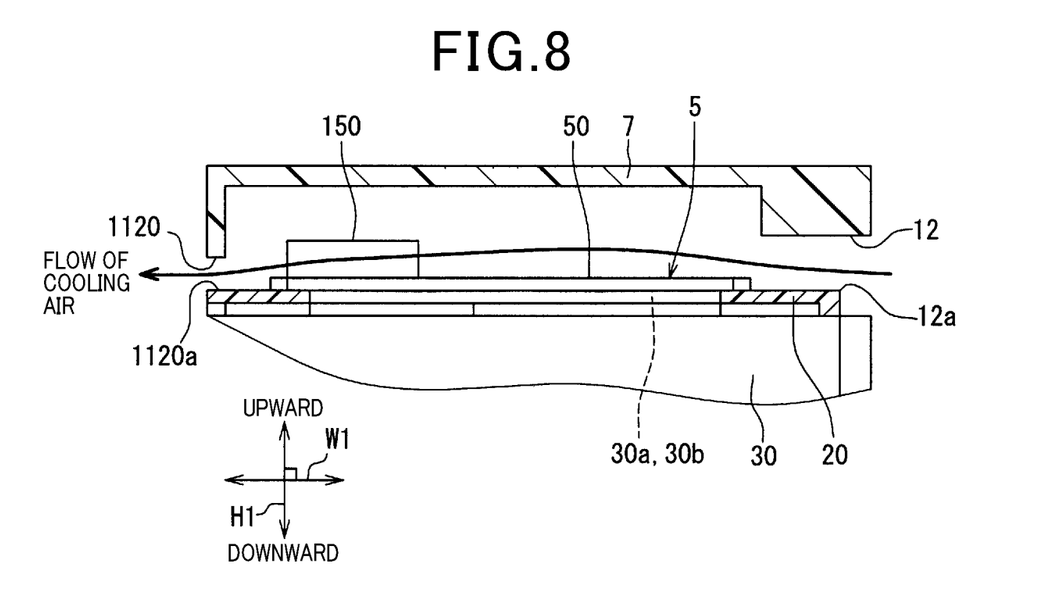
FIG. 8 is a view showing a partial cross section of the inlet part, an outlet part and the bus bars in the battery pack according to a fifth exemplary embodiment of the present invention.

FIG. 8 is a view showing a partial cross section of the inlet part 12, an outlet part 1120 and the bus bars 5 in the battery pack 1 according to the fifth exemplary embodiment.

In FIG. 8, the same components in the battery pack 1 between the fifth exemplary embodiment and the first exemplary embodiment will be referred to using the same reference numbers and characters. The explanation of the same components is omitted here for brevity because the same components have the same action and effects between the fifth exemplary embodiment and the first exemplary embodiment. The difference of the battery pack between the fifth exemplary embodiment and the first exemplary embodiment will be explained.

In the structure of the battery pack according to the fifth exemplary embodiment, the lower side wall surface 12a of the inlet part 12 is arranged at the location closer to the battery cell 30 side than the location of the surface of the bus bar 5 side, and the lower side wall surface 1120a of the outlet part 1120 is arranged at the location closer to the battery cell 30 side than the location of the surface of the bus bar 5 side. As shown in FIG. 8, a radiation fin 150 is formed on the bus bar 5 so as to increase the radiation area of the bus bar 5. The outlet part 1120 is arranged close to the radiation fin 150 side when compared with the location of the inlet part 12. The outlet part 1120 is formed to have a cross-sectional area which is smaller than a cross-sectional area of the inlet part 12.

In the structure of the battery pack according to the fifth exemplary embodiment, because one of the inlet part 12 and the outlet part 1120, which is arranged close to the radiation fin 150 side, has the cross-sectional area which is smaller than the cross-sectional area of the other part, it is possible to increase the flow speed of the cooling fluid on the surface of the bus bar 5 at the location close to the radiation fin 150. This structure makes it possible to increase the flow speed of the cooling fluid, for example cooling air, at the location having the large heat radiation capability in the bus bar 5. It is accordingly possible for the battery pack 1 according to the fifth exemplary embodiment to have the effect of heat radiation in the bus bars 5.

OTHER MODIFICATIONS

The subject matter of the present invention is not limited by the disclosure of the first to fifth exemplary embodiments previously described. It is possible for the present invention to provide various modifications of the battery pack within the subject matter of the present invention.

In the structure of the battery pack according to each of the first to fifth exemplary embodiments, the cell height direction H1 corresponds to the up and down direction. However, the subject matter of the present invention is not limited by this. For example, it is acceptable to arrange the battery pack 1 so that (1) the cover member 7 is arranged at a location which is lower in position than the location of the battery cells 30, (2) the cover member 7 and the battery cells 30 are arranged in parallel along a lateral direction, and (3) the cell height direction H1 of the battery cell 30 is slanted to the vertical direction.

In the battery pack according to the first to fifth exemplary embodiments previously described, it is acceptable to use the outer casing made of lamination sheet, and for the outer casing to have a thin plate shape and to cover the battery cell forming a battery assembly. For example. Such a lamination sheet is made of highly insulation material. Each battery assembly is covered with such a lamination sheet which has been folded in half, and accommodated in an inside chamber of the lamination sheet. Each side of the lamination sheet folded in half is sealed by a thermally melting process. In the inside chamber of the lamination sheet, the battery assembly composed of the electrode assembly, an electrolyte, a terminal connection part, a part of the positive electrode terminal, and a part of the negative electrode terminal are accommodated. Accordingly, the plural battery cells are completely sealed with the outer casing made of lamination sheet having a flat shape. The pair of the positive electrode terminal and the negative electrode terminal of each of the battery cell are exposed from the outer casing.

In the structure according to the first to fifth exemplary embodiments previously described, the battery pack 1 is composed of two battery stacks 3 as two battery assemblies. However, the subject matter of the present invention is not limited by this structure. For example, it is acceptable for the battery pack 1 to have a single battery stack 3 only, or not less than three battery packs arranged in the direction along which cooling fluid flows, or arranged in the direction which is perpendicular to the direction along which cooling fluid flows.

In the structure according to the first to fifth exemplary embodiments previously described, it is acceptable to arrange the plural battery cells forming the battery stack without gap in the inside chamber of the battery casing 4, or with a predetermined gap in the inside chamber of the battery casing 4.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A battery pack comprising:
   a battery casing section having an upper surface;
   a plurality of battery cells accommodated in the battery casing section and stacked in a predetermined stacking direction, each of the plurality of battery cells having an upper end surface and a pair of positive and negative electrode terminals projecting from the upper end surface of the corresponding one of the plurality of battery cells;
   a conductive-member casing section mounted to face the upper surface of the battery casing section;
   a plurality of conductive members disposed in the conductive-member casing section, each of the plurality of conducive members being configured to electrically connect between the positive electrode terminal of a selected one of the battery cells and the negative electrode terminal of a selected other one of the battery cells so that the battery cells are electrically connected in series; and
   a cover member arranged to face the conductive members to thereby form a cooling fluid passage between the cover member and the conductive members, the cooling fluid passage enabling cooling fluid to flow, wherein:
   the conductive-member casing section has opposing first and second walls in a flow direction of the cooling fluid passage, the flow direction of the cooling fluid passage being perpendicular to the predetermined stacking direction of the plurality of battery cells,
   the cover member has opposing first and second ends in the flow direction of the cooling fluid passage,
   the first end of the cover member is arranged to project toward the first wall of the conductive-member casing section to form an inlet opening between the first end of the cover member and the first wall of the conductive-member casing section, the inlet opening constituting an inlet of the cooling fluid passage,
   the second end of the cover member is arranged to project toward the second wall of the conductive-member casing section to form an outlet opening between the second end of the cover member and the second wall of the conductive-member casing section, the outlet opening constituting an outlet of the cooling fluid passage, and
   each of the first and second walls of the conductive-member casing section is located to be closer to the battery cells than an upper surface of the conductive members is.

2. The battery pack according to claim 1, wherein:
   each of the inlet opening and the outlet opening has a cross sectional area,
   one of the inlet opening and the outlet opening is located to be closer to the battery cells than the other of the inlet opening and the outlet opening is, and
   the cross sectional area of the one of the inlet opening and the outlet opening is smaller than the cross sectional area of the other of the inlet opening and the outlet opening.

3. The battery pack according to claim 1, wherein:
   at least one of the plurality of conductive members includes radiation fins located to be closer to one of the inlet opening and the outlet opening than to the other of the inlet opening and the outlet opening;
   each of the inlet opening and the outlet opening has a cross sectional area; and
   the cross sectional area of the one of the inlet opening and the outlet opening is smaller than the cross sectional area of the other of the inlet opening and the outlet opening.

4. The battery pack according to claim 1, wherein:
   the cooling fluid passage comprises:
     an upstream side passage;
     an intermediate communication passage; and
     a downstream side passage;
   the upstream side passage is communicated with the downstream side passage through the intermediate communication passage,
   the intermediate communication passage is comprised of wall surfaces of the cover member, and
   at least a part of the wall surfaces of the cover member is located to be closer to the battery cells than the upper surface of the conductive members is.

5. The battery pack according to claim 4, wherein:
   each of the plurality of battery cells comprises a safety valve,
   the cover member comprises a duct part that constitutes a gas discharge passage that is communicated with the safety valve of each of the battery cells, and
   the intermediate communication passage is arranged crossing the gas discharge passage, and located to be closer to the battery cell sides than the gas discharge passage is.

6. The battery pack according to claim 5, wherein:
   the inlet opening of the cooling fluid passage comprises inlet opening parts, each of the inlet opening parts being located to face a center of a corresponding one of the conductive members in a cell thickness direction perpendicular to the stacking direction, and
   the outlet opening of the cooling fluid passage comprises outlet opening parts, each of the outlet opening parts being located to face a center of a corresponding one of the conductive members in the cell thickness direction.

7. The battery pack according to claim 4, wherein:
the inlet opening of the cooling fluid passage comprises inlet opening parts, each of the inlet opening parts being located to face a center of a corresponding one of the battery cells in a cell thickness direction perpendicular to the stacking direction,
the outlet opening of the cooling fluid passage comprises outlet opening parts, each of the outlet opening parts being located to face a center of a corresponding one of the battery cells in the cell thickness direction, and
the intermediate communication passage is arranged to face both sides of the battery cells in the cell stacking direction.

8. The battery pack according to claim 1, wherein:
each of the plurality of conductive members comprises:
   a contact part arranged to contact the positive electrode terminal of a selected one of the battery cells and the negative electrode terminal a selected another one of the battery cells; and
   a bent part shaped to be farther from the battery cells than the contact part is,
wherein the bent part of each of the conductive members and the battery cells define a passage therebetween through which the cooling fluid flows.

* * * * *